Nov. 10, 1959     L. C. MINUTILLA     2,912,036

SNOW AND ICE GRIP FOR VEHICLE TIRES

Filed Nov. 19, 1957

INVENTOR.
Leon C. Minutilla

BY *L. S. Saulsbury*

ATTORNEY

2,912,036
SNOW AND ICE GRIP FOR VEHICLE TIRES

Leon C. Minutilla, Brooklyn, N.Y.

Application November 19, 1957, Serial No. 697,367

2 Claims. (Cl. 152—225)

This invention relates to a traction grip device for vehicle tires.

It is the principal object of the present invention to provide a traction grip device that can be applied to vehicle tires in a simple manner and without effort normally required for the placing of the usual tire chains on the vehicle tire.

It is still another object of the invention to provide a traction grip device for vehicle tires which can be retained in the collapsed state when not in use and which can be applied to the tire simply by placing the collapsed grip elements upon the top of the tire and dividing the outer elements of three grip elements and lowering them circumferentially through one hundred twenty degrees to spaced locations from the intermediate grip device remaining on the top of the tire and thereafter with a single turning of a clamping screw joining the members upon the tire and positively lock them against circumferential displacement relative to each other.

It is still another object of the invention to provide a tire grip element by itself which has an arm reinforced with a rib and this rib entering the tire grip shoe element to lock the shoe element positively with the arm and prevent the shearing of the holding rivets securing the grip element to the arm.

Further objects of the invention are to provide a traction grip device having the above objects in mind, which is of simple construction, inexpensive to manufacture, consumes little space when collapsed, has a minimum number of parts, efficient and effective in use.

Figure 1:
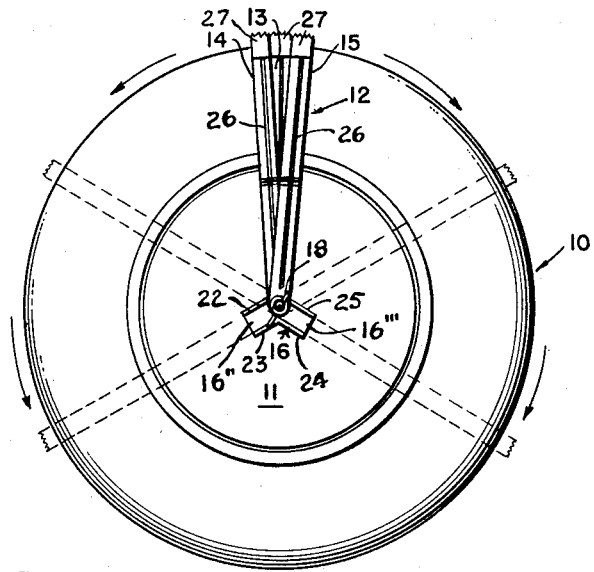
Figure 3:
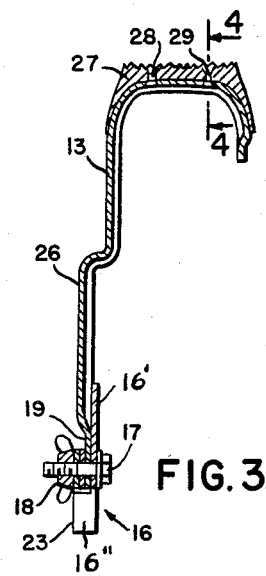
Figure 2:
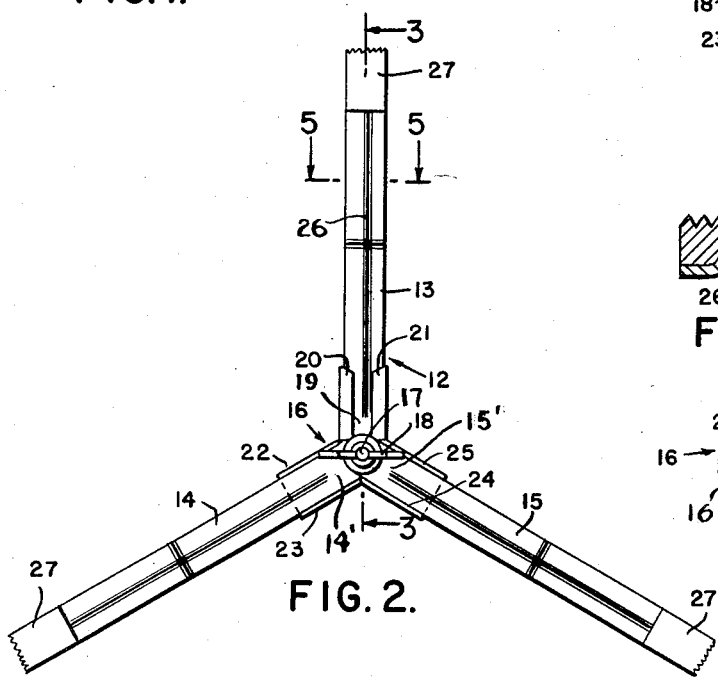
Figure 4:
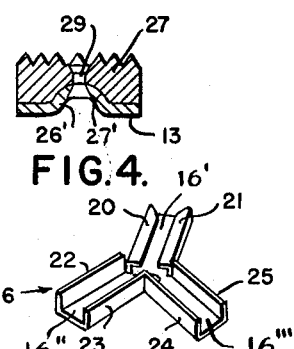
Figure 6:
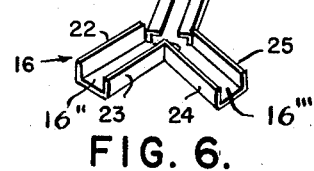
Figure 5:

For other objects, and for a better understanding of the invention, reference may be had to the following detailed description taken in connection with the accompanying drawing, in which Figure 1 is an elevational view of a tire wheel with the tire grip device supported thereon and with illustration made as to the manner in which the outer two grip arms are extended to their final grip positions upon the tire, Fig. 2 is an enlarged elevational view of the device free of the tire and with the arms locked to one another in their final grip positions, Fig. 3 is a vertcal sectional view taken on line 3—3 of Fig. 2, Fig. 4 is an enlarged sectional view taken on line 4—4 of Fig. 3 of the attachment of the grip element with the arm, Fig. 5 is a transverse sectional view taken on line 5—5 of Fig. 2, and Fig. 6 is a perspective view of a central plate.

Referring now to the figures, 10 represents a vehicle tire that is mounted upon a wheel 11 and upon which the traction grip device of the present invention is to be placed. The traction grip device or assembly is indicated generally at 12. This device comprises three grip arms, an intermediate arm 13 and outer arms 14 and 15 which are dropped from the intermediate arm 13 in the direction of the arrows as illustrated in Fig. 1. These arms are joined together upon a central locking plate 16 and by a pivot bolt 17 and a thumb nut 18. The intermediate arm has a flattened and inner end 19 that is secured to the central locking plate by opposing lips 20 and 21 of a projection 16' thereof. The outer arm 14 has a flattened inner end 14' that is pivotally connected to the bolt 17 and when swung to its locking position is held against angular displacement on a projection 16" and relative to the fixed arm 13 by lips 22 and 23 thereof. The outer arm 15 likewise has a flattened inner end 15' that is pivotally connected to the bolt 17 and when swung to its locking position is held against angular displacement on a projection 16''' and relatively fixed arm 13 by lips 24 and 25. Accordingly, once the arms have been adjusted over the tire and put in locking positions upon the plate 16 and the clamping nut 18 tightened all three arms are positively locked together. The projections 16', 16" and 16''' extend one hundred and twenty degrees from one another, whereby the traction grip arms will be circumferentially spaced one hundred and twenty degrees upon the tire.

The arms are of such length that their outer ends snugly contact the peripheral surface of the tire to prevent any rotation of the device over the exterior of the tire. Each of the arms while flattened on its pivot end has an inwardly extending rib 26 that runs throughout the length of the same and laterally over the top as indicated at 26'. This rib while giving strength to the arm also provides over the tire grip top thereof a rib for accommodating and receiving internally grooved grip element 27 with a groove 27' which is secured against outward displacement from the arm by rivets or fastener elements 28 and 29. These rivets do not need to assume shearing stresses as the rib portion 26' that is run fully over the top of the arm may assume the full shear load and distribute it well throughout the attachment of the grip element 27 thereto.

When the grip device is not in use the grip arms 14 and 15 are collapsed upon the intermediate arm 13 as shown in Fig. 1 and may be stored without consuming great space.

While various changes may be made in the detail construction, it shall be understood that such changes shall be within the spirit and scope of the present invention as defined by the appended claims.

What is claimed is:

1. A traction grip device for vehicles comprising a central plate adapted to be aligned with the vehicle tire axis and having a central hole extending therethrough and three projections angled from one another one hundred and twenty degrees apart, an arm rigidly secured to one of said projections and extending radially and adapted to extend laterally over the tire surface from the front face to the rear face thereof, a pivot bolt extending through the center of said central plate, two grip arms pivotly connected upon said bolt and adapted to be pivoted between collapsed positions adjacent the one arm and positions overlying the two other projections on the plate and one hundred twenty degrees apart, said two other projections respectively having opposing locking lips and the inner ends of said arms adapted to be registered within the lips when angled over the projections, said opposing locking lips lying in close proximity to the pivot bolt and a clamp nut adjustable upon the pivot bolt to force the inner ends of the pivotally connected arms into their locked positions between the locking lips and to hold them against outward displacement therefrom and to provide a rigid central structure assembly thereof.

2. A traction grip device for vehicles as defined in claim 1, and said arms having a flattened inner end for connection with said central plate and an external rib extending radially and laterally throughout substantially the remaining length of the arm to reinforce the arm and a traction grip element adapted to extend laterally over the outer end of each arm and having an inner groove for receiving the rib so that straining forces upon the grip element will be transmitted through the rib to the arm and fastening elements for securing the traction grip to the arm against outward displacement therefrom.

References Cited in the file of this patent

UNITED STATES PATENTS

| | | |
|---|---|---|
| 2,597,458 | Cummins | May 20, 1952 |
| 2,687,759 | Keinanen | Aug. 31, 1954 |
| 2,691,999 | Ziegler | Oct. 19, 1954 |
| 2,806,503 | Hamerski | Sept. 17, 1957 |